(12) United States Patent  (10) Patent No.: US 6,501,510 B1
Moon  (45) Date of Patent: Dec. 31, 2002

(54) DIGITAL/ANALOG BROADCAST SIGNAL PROCESSING UNIT

(75) Inventor: Yang-choon Moon, Suwon (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/340,926

(22) Filed: Jun. 28, 1999

(30) Foreign Application Priority Data

Jun. 26, 1998 (KR) .............................. 98-24414

(51) Int. Cl.⁷ ................................. H04N 5/46
(52) U.S. Cl. ................. 348/553; 348/555; 348/575; 348/554; 348/445
(58) Field of Search ................ 348/555, 575, 348/553, 554, 445

(56) References Cited

U.S. PATENT DOCUMENTS

| | | | | |
|---|---|---|---|---|
| 5,461,427 A | * | 10/1995 | Duffield et al. | 348/555 |
| 5,557,337 A | * | 9/1996 | Scarpa | 348/555 |
| 5,598,221 A | * | 1/1997 | Miyahara et al. | 348/554 |
| 5,844,623 A | * | 12/1998 | Iwamura | 348/555 |
| 5,896,177 A | * | 4/1999 | Hwang | 348/445 |
| 5,926,228 A | * | 7/1999 | Jeon et al. | 348/554 |
| 6,014,178 A | * | 1/2000 | Jeon et al. | 348/554 |
| 6,034,737 A | * | 3/2000 | Koyama et al. | 348/552 |
| 6,055,023 A | * | 4/2000 | Rumreich et al. | 348/553 |
| 6,057,889 A | * | 5/2000 | Reitmeier et al. | 348/555 |
| 6,072,541 A | * | 6/2000 | Song | 348/555 |
| 6,091,458 A | * | 7/2000 | Jeon et al. | 348/554 |

FOREIGN PATENT DOCUMENTS

WO   WO 98/14005   4/1998

* cited by examiner

Primary Examiner—John Miller
Assistant Examiner—Linus H. Lo
(74) Attorney, Agent, or Firm—Dilworth & Barrese, LLP

(57) ABSTRACT

A digital/analog broadcast signal processing unit is provided by which a video/audio signal can be processed by receiving an analog broadcast signal and a digital broadcast signal and switching a signal processing block which is used in common for digital broadcast signal processing and analog broadcast signal processing. The digital/analog broadcast signal processing unit includes a digital broadcast signal processor for demodulating the digital broadcast signal tuned by the tuner, demultiplexing the demodulated digital broadcast signal into video and audio signals, and decoding the audio and video signals; an analog broadcast signal demodulator for demultiplexing the analog broadcast signal tuned by the tuner into analog video and audio signals and demodulating the video and audio signals; an audio switching unit for receiving the audio signals output from at least one of the digital broadcast signal processor and analog broadcast signal demodulator and selecting one input signal; a video switching unit for receiving the video signals output from at least one of the digital broadcast signal processor and analog broadcast signal demodulator and selecting one input signal; an audio signal processing block for receiving the output signal of the audio switching unit, for compensating characteristics of the audio signal, and for outputting the compensated audio signal via a speaker; and a video signal processing block for receiving the output signal of the video switching unit, for compensating characteristics of the video signal, and for outputting the compensated video signal. The digital/analog broadcast signal processing unit further includes a controller for determining whether the digital broadcast signal is received, and generating one of the first switching control signal and the second switching control signal for selecting one signal of the audio and video switching units according to one of a presence or absence of the digital broadcast signal, and a selection of a user via a key input unit connected to the controller.

11 Claims, 1 Drawing Sheet

DIGITAL/ANALOG BROADCAST SIGNAL PROCESSING UNIT

PRIORITY

This application claims priority to an application entitled "Digital/Analog Broadcast Signal Processing Unit" filed in the Korean Industrial Property Office on Jun. 26, 1998 and assigned Serial No. 98-24414, the contents of which are incorporated herein by reference.

BACKGROUND OF THE INVENTION

1. Field of the Invention

The present invention relates to a signal processing unit, and more particularly, to a digital/analog broadcasting signal processing unit for processing a video/audio signal by receiving an analog broadcasting signal and a digital broadcasting signal, and switching a signal processing block used in common by digital processing hardware and analog processing hardware.

2. Description of the Related Art

Even with the development of broadcasting techniques, analog broadcasting and digital broadcasting cannot be simultaneously achieved. However, it is envisioned that one day broadcasting stations will be able to transmit a digital broadcast signal and an analog broadcast signal at the same time. At a receiver end, equipment will be needed for receiving and processing the analog and digital signals transmitted by the broadcasting stations.

For example, the receiver end will need to have an analog video/audio signal processing circuit for receiving and processing the analog broadcast signals, and a digital video/audio signal processing circuit for receiving and processing the digital broadcast signals. The analog and digital signal processing circuits of the prior art are not designed as a single unit, and hence, will need to be separately installed.

In operation, when an analog television broadcast signal is received, a video/audio signal will be processed by the analog video/audio signal processing unit, and when a digital television broadcast signal is received, a video/audio signal will be processed by the separate digital video/audio signal processing unit. Accordingly, there is a need for a video/audio signal processing block capable of being used in common for processing analog and digital signals to defray costs associated with installing two signal processing circuits instead of one.

SUMMARY OF THE INVENTION

To solve the above problem, it is an objective of the present invention to provide a digital/analog broadcast signal processing unit by which a video/audio signal is processed by a video/audio signal processing block capable of being used in common in an analog-broadcast video/audio signal processing circuit and in a digital-broadcast video/audio signal processing circuit by switching and connecting the block for common use by an analog broadcast signal processing block or a digital broadcast signal processing block Accordingly, to achieve the above objective, there is provided a digital/analog broadcast signal processing unit for processing analog and digital broadcast signals, the analog and digital broadcast signals received via an antenna and tuned by a tuner, the unit includes a digital broadcast signal processor for demodulating the digital broadcast signal tuned by the tuner, demultiplexing the demodulated digital broadcast signal into video and audio signals, and decoding the audio and video signals; an analog broadcast signal demodulator for demultiplexing the analog broadcast signal tuned by the tuner into analog video and audio signals and demodulating the video and audio signals; an audio switching unit for receiving the audio signals output from at least one of the digital broadcast signal processor and analog broadcast signal demodulator and selecting one input signal; a video switching unit for receiving the video signals output from at least one of the digital broadcast signal processor and analog broadcast signal demodulator and selecting one input signal; an audio signal processing block for receiving the output signal of the audio switching unit, for compensating characteristics of the audio signal, and for outputting the compensated audio signal via a speaker; and a video signal processing block for receiving the output signal of the video switching unit, for compensating characteristics of the video signal, and for outputting the compensated video signal.

The digital/analog broadcast signal processing unit further includes a controller for determining whether the digital broadcast signal is received, and generating one of the first switching control signal and the second switching control signal for selecting one signal of the audio and video switching units according to one of a presence or absence of the digital broadcast signal, and a selection of a user via a key input unit connected to the controller.

BRIEF DESCRIPTION OF THE DRAWING

The above objective and advantage of the present invention will become more apparent by describing in detail a preferred embodiment thereof with reference to the attached drawing in which.

DESCRIPTION OF THE PREFERRED EMBODIMENTS

Figure 1:
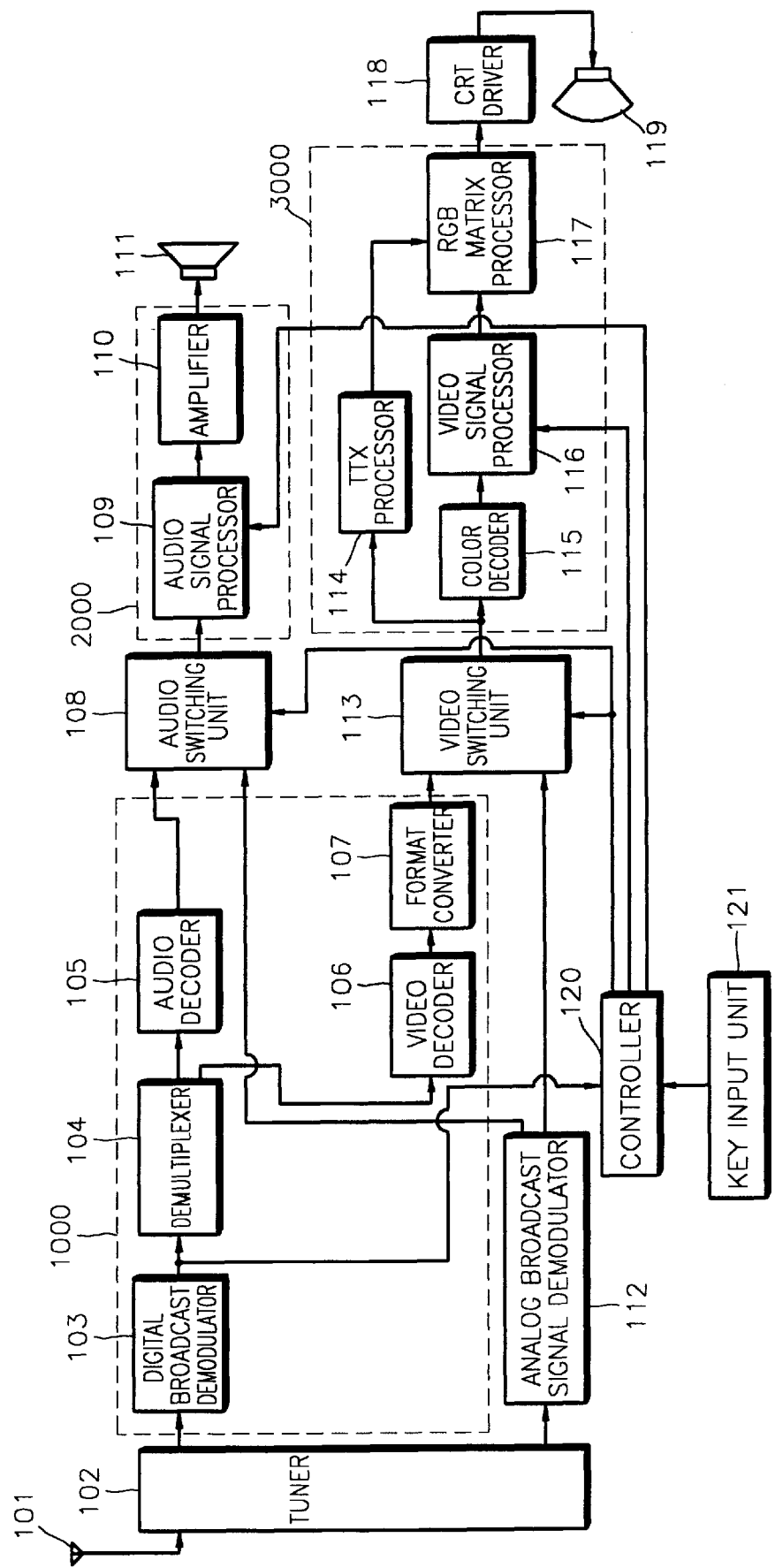
FIG. 1 is a block diagram of a digital/analog broadcast signal processing unit according to the present invention.

With reference to FIG. 1, a digital/analog broadcast signal processing unit according to the present invention is shown. The digital/analog broadcast signal processing unit includes an antenna 101, a tuner 102, a digital broadcast signal demodulator 103, a demultiplexer 104, an audio decoder 105, a video decoder 106, a format converter 107, an audio switching unit 108, an audio signal processor 109, an amplifier 110, a speaker 111, an analog broadcast signal demodulator 112, a video switching unit 113, a TTX processor 114, a color decoder 115, a video signal processor 116, an RGB matrix processor 117, a cathode ray tube (CRT) driver 118, a cathode ray tube 119, a controller 120, and a key input unit 121.

A block including the digital broadcast signal demodulator 103, the demultiplexer 104, the audio decoder 105, the video decoder 106, and the format converter 107 is called a digital broadcast signal processing block 1000. A block including the audio signal processor 109 and the amplifier 110 is called an audio signal processing block 2000. A block including the TTX processor 114, the color decoder 115, the video signal processor 116, and the RGB matrix processor 117 is called a video signal processing block 3000.

The operation in which a digital/analog broadcasting signal is received and the video/audio signal is processed, according to the above-described configuration, will now be described.

The antenna 101 receives a digital broadcast signal or analog broadcast signal from a broadcasting station. The antenna 101 generally receives broadcasting signals transmitted by the broadcasting station through a digital broadcast signal receiving antenna and an analog broadcast signal receiving antenna. However, it is contemplated that the broadcast signals transmitted by the broadcasting station can be received through a single antenna designed to receive both the analog and digital broadcast signals.

For the digital or analog broadcast signal received by the antenna 101, the tuner 102 tunes and outputs the broadcast signal for a channel selected by a user. That is, when the digital broadcast signal is received, the tuner 102 tunes the digital broadcast signal using a digital broadcast tuner installed therein and outputs the tuned broadcast signal to the digital broadcast signal demodulator 103. When the analog broadcast signal is received, the tuner 102 tunes the analog broadcast signal using an analog broadcast tuner installed therein and outputs the tuned broadcast signal to the analog broadcast signal demodulator 112. When the analog broadcast signal and the digital broadcast signal are received simultaneously, they are tuned and output to the digital broadcast signal demodulator 103 and the analog broadcast signal demodulator 112, respectively.

When the digital broadcast signal is received, it is demodulated by the digital broadcast signal demodulator 103 and output as a multi-bit stream. Then, the multi-bit stream is demultiplexed into a video data in bit stream and audio data in bit stream by the demultiplexer 104, and the video data and the audio data are output to the video decoder 106 and the audio decoder 105, respectively.

The audio data in bit stream is decoded by the audio decoder 105, converted into an analog signal, and applied to a first input port of the audio switching unit 108. The video data in bit stream is decoded by the video decoder 106, converted into an analog composite video signal by the format converter 107, and applied to a first input port of the video switching unit 113.

When the analog broadcast signal is received, it is divided into a video signal and an audio signal and demodulated by the analog broadcast signal demodulator 112. Next, the demodulated analog audio signal is applied to a second input port of the audio switching unit 108, and the demodulated analog video signal is applied to a second input port of the video switching unit 113.

The controller 120 also receives the demodulated video/audio multiple bit stream input to the demultiplexer 104, and determines whether the digital broadcast signal is received by a tuned channel. When it is determined that the digital broadcast signal is received, the controller 120 generates a switching control signal for selecting the digital broadcast audio/video signal as the input to the first input port of each of the audio switching unit 108 and the video switching unit 113.

The program of the control unit 120 can be designed to give priority to the digital broadcast signal when the digital and analog broadcast signals are simultaneously received. It is, however, contemplated that the switching control signal can be generated by a user manually selecting the input signals of the audio switching unit 108 and the video switching unit 113 through a key command inputted via the key input unit 121.

When the digital broadcast signal is not detected, a switching control signal to automatically select the analog broadcast signals as the input to the second input ports of the audio and video switching units 108 and 113 is be generated. Hence, either the decoded digital broadcast audio signal input via the first input port, or the demodulated analog broadcast audio signal input via the second input port is selected by the audio switching unit 108 according to the switching control signal of the controller 120.

The audio signal processor 109 receives the decoded digital broadcast audio signal or demodulated analog broadcast audio signal selected by the audio switching unit 108, and performs audio signal processing such as correction of frequency characteristics, control of the audio level, etc. The audio signal processor 109 can also perform audio signal processing such as compensation of the frequency characteristics, change of the audio level, boosting of the treble/bass, etc., according to a value set by a user's key input through the key input unit 121. Various compensation circuits such as a circuit for removing echo can be added to the audio signal processor 109 according to the type of machine.

Next, the audio signal processed signal is amplified to a certain level by the amplifier 110, impedance-matched with the speaker 111, and output via the speaker 111.

Either the decoded digital broadcast video signal input via the first input port, or the demodulated analog broadcast video signal input via the second input port is selected by the video switching unit 113 according to the switching control signal of the controller 120.

The digital or analog broadcast video signal, having a composite video signal selected by the video switching unit 113 is converted into a luminance signal and a color signal by the color decoder 115. The video signal processor 116 compensates the frequency and noise characteristics of the luminance signal and the noise and phase characteristics of the color signal. In particular, the definition, brightness, and color of a screen are compensated according to a selection by the user via the key input 121, and the luminance signal and the color signal having the above-compensated characteristics are then converted into R, G, and B signals.

When character broadcast data is received, the TTX processor 114 decodes the character broadcast data and converts it into character R, G, and B signals. The RGB matrix processor 117 mixes the signal output from the video signal processor 116 and the signal output from the TTX processor 114, and performs R, G, and B matrix calculation in order for the coordinates to drive R, G, and B electron guns so that the mixed signal can be output via the CRT 119. Thereafter, the R, G, and B electron guns are driven by the CRT driver 118, and a video signal is output to the CRT 119.

In the processing of the analog and digital broadcast signals according to the above-described configuration, the audio and video signal processing blocks 2000 and 3000 capable of being shared, are not redundantly installed for each of the analog and digital broadcast signals, and only one block is used to process each of the analog and digital broadcast signals. When the digital and analog broadcast signals are simultaneously received, the digital broadcast signal is preferentially and automatically selected to be video/audio signal processed.

According to the present invention as described above, one video/audio signal processing block capable of being used in common for digital broadcast signal processing and analog broadcast signal processing is installed to switch between two input signals according to the type of signal (i.e., an analog or digital broadcast signal) and process the received digital and analog broadcast audio/video signals in common. Thus, both the digital/analog broadcast signals can be processed with a small number of parts, thereby reducing manufacturing costs.

While t he invention has been shown and described with reference to a certain preferred embodiment thereof, it will be understood by those skilled in the art that various changes in form and details may be made therein without departing from the spirit and scope of the invention as defined by the appended claims.

What is claimed is:

1. A digital/analog broadcast signal processing unit for processing analog and digital broadcast signals, the analog and digital broadcast signals received via an antenna and tuned by a tuner, the unit comprising:

a digital broadcast signal processor for demodulating the digital broadcast signal tuned by the tuner, demultiplexing the demodulated digital broadcast signal into video and audio signals, and decoding the audio and video signals;

an analog broadcast signal demodulator for demultiplexing the analog broadcast signal tuned by the tuner into analog video and audio signals and demodulating the video and audio signals;

an audio switching unit for receiving the audio signals output from at least one of the digital broadcast signal processor and analog broadcast signal demodulator and selecting one input signal;

a video switching unit for receiving the video signals output from at least one of the digital broadcast signal processor and analog broadcast signal demodulator and selecting one input signal;

an audio signal processing block for receiving the output signal of the audio switching unit, for compensating characteristics of the audio signal, and for outputting the compensated audio signal; and a video signal processing block for receiving the output signal of the video switching unit, for compensating characteristics of the video signal, and for outputting the compensated video signal, wherein the video signal processing block comprises:

a color decoder for receiving a composite video signal, the composite video signal being an output signal of the video switching unit, and for converting the composite video signal into a luminance signal and a color signal;

a video signal processor for changing characteristics of the luminance signal and the color signal output by the color decoder according to a selection of a user, and converting the luminance and color signals having changed characteristics into R, G, and B signals; and an R, G, and B matrix processor for mixing the R, G, and B signals of the video signal processor and executing R, G, and B matrix calculation to output mixed signals to a cathode ray tube.

2. The digital/analog broadcast signal processing unit as claimed in claim 1, further comprising:

a controller for determining whether the digital broadcast signal is received, and generating one of the first switching control signal and the second switching control signal for selecting one signal of the audio and video switching units according to one of a presence or absence of the digital broadcast signal, and a selection of a user via a key input unit connected to the controller.

3. The digital/analog broadcast signal processing unit as claimed in claim 1, wherein the audio signal processing block compensates the characteristics of the audio signal according to a selection of a user via a key input unit.

4. The digital/analog broadcast signal processing unit as claimed in claim 1, wherein the video signal processing block outputs the compensated video signal to a cathode ray tube.

5. The digital/analog broadcast signal processing unit as claimed in claim 1, wherein the digital broadcast signal process or comprises:

a digital broadcast signal demodulator for demodulating the digital broadcast signal tuned by the tuner;

a demultiplexer for demultiplexing the output data of the digital broadcast signal demodulator into audio data and video data;

a video decoder for decoding the video data and outputting an output signal;

an audio decoder for decoding the audio data and converting the decoded audio signal into an analog audio signal; and a format converter for converting a format of the output signal of the video decoder into a specification of an analog composite video signal in accordance with a signal processing standard.

6. The digital/analog broadcast signal processing unit as claimed in claim 1, wherein the audio signal processing block comprises:

an audio signal processor for changing audio frequency characteristics and an audio level of the audio signal according to a selection of a user and outputting an output signal; and an amplifier for amplifying the output signal of the audio signal processor to have a predetermined gain.

7. The digital/analog broadcast signal processing unit as claimed in claim 1, wherein the controller is set to select and output the digital broadcast video and audio signals from the video and audio signals received by the audio and video switching units when the digital broadcast signal is received, and to select and output the analog broadcast video and audio signals when the digital broadcast signal is not received.

8. The digital/analog broadcast signal processing unit as claimed in claim 1, wherein the audio switching unit selects one input signal according to a first switching control signal.

9. The digital/analog broadcast signal processing unit as claimed in claim 1, wherein the video switching unit selects one input signal according to a second switching control signal.

10. The digital/analog broadcast signal processing unit as claimed in claim 1, wherein the audio signal processing block outputs the compensated audio signal via a speaker.

11. The digital/analog broadcast signal processing unit as claimed in claim 1, wherein the video signal processing block further comprises:

a TTX processor for decoding character broadcast data included in the composite video signal and converting the decoded composite video signal into R, G, and B character signals, and the R, G, and B matrix processor mixes the R, G, and B signals of the video signal processor and the TTX processor, and executes the R, G, and B matrix calculation to output mixed signals to the cathode ray tube.

* * * * *